United States Patent

[11] 3,603,705

[72] Inventor Harin Chandraratna
 London, England
[21] Appl. No. 864,505
[22] Filed Oct. 7, 1969
[45] Patented Sept. 7, 1971
[73] Assignee C.A.V. Limited
 London, England
[32] Priority Oct. 15, 1968
[33] Great Britain
[31] 48844/68

[54] CHECK VALVES
 1 Claim, 2 Drawing Figs.
[52] U.S. Cl. .................................................. 417/253,
 137/608, 417/508
[51] Int. Cl. .................................................. F04b 5/00,
 E03c, F04b 39/08
[50] Field of Search ......................................... 417/253,
 507, 508; 137/608

[56] References Cited
UNITED STATES PATENTS
439,825  11/1890  Riedler .................... 417/508
2,381,917  8/1945  Lornitzo ................... 137/608 X
2,752,862  7/1956  Boakes ..................... 417/507

Primary Examiner—Robert M. Walker
Attorney—Holman & Stern

ABSTRACT: A check valve including a valve member which can cooperate with a seating to prevent flow of fluid in one direction and which can be lifted from its seating by pressure of fluid, the check valve including a piston which is actuated by a fluid pressure so that it urges the valve member onto the seating. In this manner the valve member is closed onto the seating as quickly as possible when the pressure of liquid acting to lift the valve member from the seating falls.

PATENTED SEP 7 1971 3,603,705

INVENTOR
Harin Chandraratna
BY Holman, Glascock,
Downing & Seebold
ATTORNEYS

CHECK VALVES

This invention relates to check valve or nonreturn valves of the kind including a closure member movable onto or away from a seating in response to the pressure upstream or downstream of the seating.

The object of the invention is to provide such a check valve in a simple and convenient form.

According to the invention a check valve of the kind specified as associated therewith a fluid pressure operable piston which acts upon the closure member in a direction to urge the closure member onto the seating, the force exerted on the closure member by the piston being arranged to be less than the force exerted on the closure member prior to it being lifted from the seating.

Figure 1:
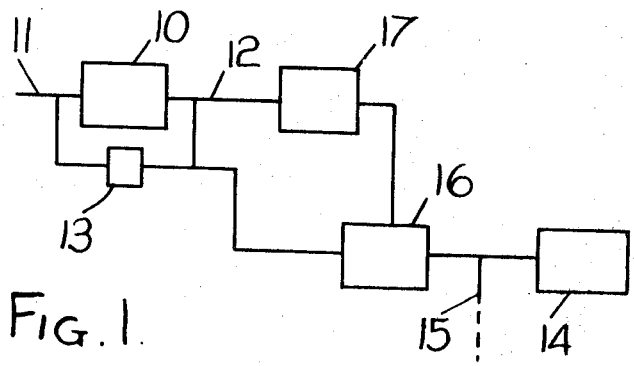
Figure 2:
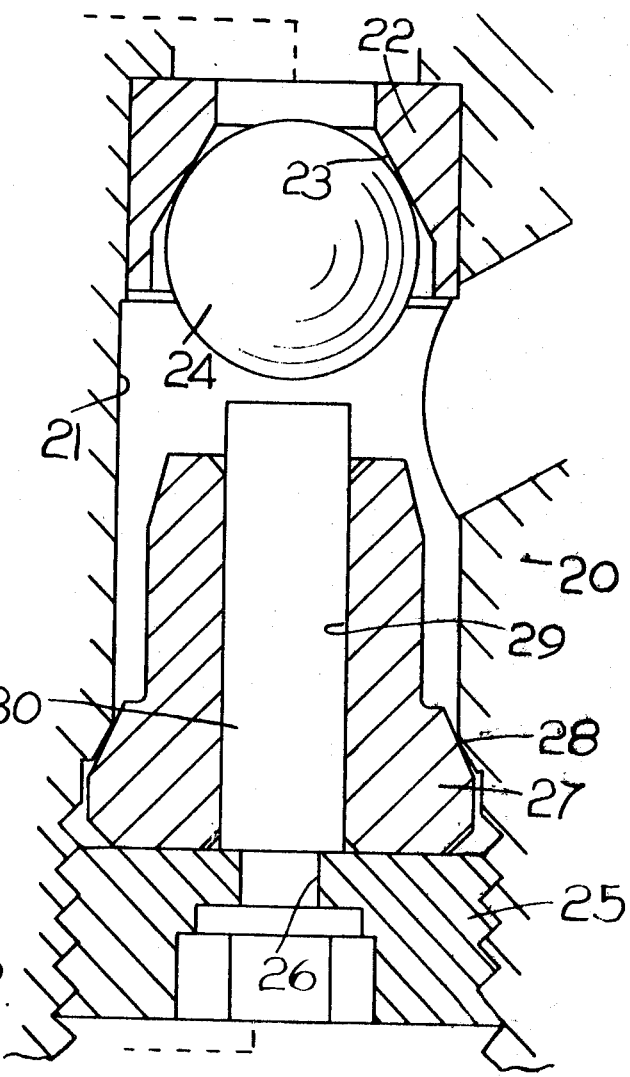

In the accompanying drawings:

FIG. 1 is a schematic layout of a liquid fuel pumping apparatus incorporating one example of a valve in accordance with the invention; and FIG. 2 is a sectional side elevation showing one example of a valve in accordance with the invention.

One example of a check valve will now be described as applied to valves for controlling the flow of liquid fuel into the pumping chamber of an injection pump forming part of an apparatus for supplying fuel to an internal combustion engine of the compression ignition-type.

As shown in FIG. 1 of the drawings the apparatus comprises a feed pump 10 having an inlet conduit 11 and an outlet conduit 12. The inlet conduit in use, is connected to a source of liquid fuel and the inlet and outlet conduits are interconnected by a relief valve 13 which controls the output pressure of the feed pump. The outlet conduit 12 extends to an injection pump 14 which is provided with a pumping chamber from which fuel at high pressure flows during an injection stroke of the injection pump. The high pressure fuel flows from the injection pump through a delivery conduit 15 to the associated engine and this can include a rotary valve (not shown) whereby the fuel can be distributed to each in turn of the engine cylinders.

A one way valve 16 is provided intermediate the feed pump and the injection pump to prevent back flow of fuel to the feed pump during the injection stroke and a fuel metering device 17 is provided to control the quantity of fuel supplied by the feed pump to the injection pump during the filling periods thereof.

During a filling stroke a predetermined volume of fuel is passed into the pumping chamber of the injection pump 14 and during this time the valve 16 is opened. At the start of the next injection stroke the valve must close quickly so that flow of fuel back to the metering device is prevented.

It has been found that for instance with a ball-type check valve, there is leakage of fuel past the ball before it attains the closed position. Unfortunately the quantity of fuel leakage depends in part upon the position of the ball prior to its movement towards the seating. This position is arbitrary so that it is not possible to compensate for the leakage by allowing extra fuel to flow to the injection pump since the quantity of extra fuel will vary each time.

The check valve or non return valve 16 of the example comprises a body 20 in which is defined a cylindrical main bore 21 which intermediate its ends intersects the passage communicating with the pumping chamber of the injection pump 14. Located against a step defined at one end of the bore is an annular member 22 which defines a seat 23 for a valve element in the form of a ball 24. This end of the bore 21 is in communication with the outlet of the feed pump 10 by way of the metering device 17. The other end of the bore is closed by a plug 25 in which is formed an axial passage 26 and this passage communicates directly with the outlet of the feed pump.

The plug 25 serves to maintain a cylindrical flanged member 27 in position against an edge 28 defined in the bore and a fluid tight seal is defined therebetween. Formed in the flanged member 27 is a cylinder 29 and slidable within the cylinder is a piston 30, the diameter of the piston 30 being greater than the diameter of the passage 26. In addition the end surface area of the piston is smaller than the surface area of the ball 24 which when the ball is against the seal, is exposed to the outlet pressure of the feed pump.

In use, and during an injection stroke of the injection pump a high pressure exists within the bore 21 and this forces the ball 24 against the seat 23 thereby to establish a fluid seal and preventing escape of the high pressure fuel. In addition, the piston 30 is urged into contact with the end surface of the plug 25. At the end of the injection stroke when the high pressure of fuel within the bore 20 ceases to exist the ball 24 will be lifted from the seat to allow fuel to flow from the metering device to the injection pump. During this period the piston 30 will be held against the plug. At the end of the filling stroke and as the pressure of fuel supplied by the metering device falls the piston will move the ball into sealing contact with seat 23 so that the valve will be closed before the high pressure encountered during the injection stroke is developed. At the start of the injection stroke the piston will be moved into contact with the plug 25 but during this movement the ball will be held on its seat thereby preventing the escape of the carefully measured quantity of fuel supplied by the metering device.

The difference in the aforesaid areas of the piston and ball is carefully chosen so as to ensure that the ball can be moved away from the seat against the closing force developed by the piston and in choosing the areas the pressure drop which may occur in the metering device is taken into consideration. Conveniently the metering device includes a shuttle slidable within a bore the shuttle being moved outwardly by a charge of fuel supplied to the bore and being moved inwardly during the filling stroke of the injection pump to displace the charge of fuel to the injection pump. The movement of the shuttle being effected by the outlet pressure of the feed pump.

Having thus described my invention what I claim as new and desire to secure by Letters Patent is:

1. A liquid fuel injection pumping apparatus for supplying fuel to an internal combustion engine and comprising a check valve, the check valve including a body part in which is defined a bore, an annular member located at one end of the bore, a seating defined by said annular member, a closure member in the form of a ball for cooperation with said seating, a plug member serving to close the other end of said bore, a cylindrical flanged member held by the plug against an edge defined within the bore, a cylinder defined in said member, a piston mounted in said cylinder, and first, second and third passages communicating with said one end, said other end and the intermediate portion of the bore respectively, the apparatus further comprising an injection pump having a pumping chamber in communication with said third passage, a feed pump having an outlet in communication with said second passage, a metering device through which the outlet of the feed pump communicates with said first passage, the arrangement being that during a filling stroke of the injection pump the ball is lifted from its seating by the flow of fuel through said first passage and when the flow of such fuel ceases the ball is urged onto the seating by the piston before the start of the injection stroke of the injection pump.